US008549494B2

(12) United States Patent
Neogi et al.

(10) Patent No.: US 8,549,494 B2
(45) Date of Patent: Oct. 1, 2013

(54) TECHNIQUES FOR PARSING ELECTRONIC FILES

(75) Inventors: Atanu Neogi, Framingham, MA (US); David Jay Barbrow, Needham, MA (US)

(73) Assignee: Symantec Corporation, Mountain View, CA (US)

( * ) Notice: Subject to any disclaimer, the term of this patent is extended or adjusted under 35 U.S.C. 154(b) by 1308 days.

(21) Appl. No.: 11/770,384

(22) Filed: Jun. 28, 2007

(65) Prior Publication Data

US 2009/0007083 A1 Jan. 1, 2009

(51) Int. Cl.
G06F 9/45 (2006.01)

(52) U.S. Cl.
USPC .......................................................... 717/143

(58) Field of Classification Search
None
See application file for complete search history.

(56) References Cited

U.S. PATENT DOCUMENTS

| | | | |
|---|---|---|---|
| 5,802,262 A | 9/1998 | Van De Vanter | |
| 6,449,603 B1 * | 9/2002 | Hunter | 706/15 |
| 6,954,925 B1 * | 10/2005 | Kong | 717/143 |
| 7,685,316 B2 * | 3/2010 | Sukumaran | 709/246 |
| 7,774,746 B2 * | 8/2010 | Mansfield et al. | 717/106 |
| 7,818,666 B2 * | 10/2010 | Dorsett et al. | 715/237 |
| 7,873,992 B1 * | 1/2011 | Daily et al. | 726/11 |
| 2004/0015959 A1 | 1/2004 | Kobayashi | |
| 2006/0195588 A1 * | 8/2006 | Pennington et al. | 709/227 |
| 2007/0245327 A1 * | 10/2007 | Dietz et al. | 717/143 |
| 2008/0141230 A1 * | 6/2008 | Rowlett et al. | 717/143 |

FOREIGN PATENT DOCUMENTS

| | | |
|---|---|---|
| JP | 11-305998 | 11/1999 |
| JP | 2004086863 | 3/2004 |
| JP | 2007-141058 | 6/2007 |

OTHER PUBLICATIONS

Jackson, D., "Parsing and Translation of Expressions by Genetic Programming", Genetic Programming Online, Retrieved from the Internet at: http://delivery.acm.org/10.1145/1070000/1068291/p1681-jackson.pdf?key1=1068291&key2=3597596321&coll=GUIDE&dl=GUIDE&CFID=26, Retrieved from the Internet on Mar. 13, 2009.
Extended European Search Report in Application No. 08159376.6, dated Apr. 3, 2009.
Acovea, "Using Natural Selection to Investigate Software Complexities", retrieved from the internet at http://www.coyotegulch.com/products/acovea/index.html, retrieved from the internet on Sep. 7, 2007.
"Ga-GM", retrieved from the internet at http://stommel.tamu.edu/~baum/linuxlist/linuxlist/node19.html, retrieved from the internet on Sep. 7, 2007.
BioJava, "BioJava: BioJavaXDocs", retrieved from the internet at http://www.biojava.org/wiki/BioJava:BioJavaXDocs, retrieved from the internet on Sep. 7, 2007.

(Continued)

*Primary Examiner* — Li B Zhen
*Assistant Examiner* — Evral Bodden
(74) *Attorney, Agent, or Firm* — Wilmer Cutler Pickering Hale and Dorr LLP

(57) ABSTRACT

Techniques for parsing electronic files are disclosed. In one particular exemplary embodiment, the techniques may be realized as an apparatus for parsing electronic files comprising an input module operable to read one or more electronic files, a syntax element store, associated with one or more syntax elements, a mutation module operable to mutate one or more of the one or more syntax elements and parse the one or more electronic files read from the input module, and an output module operable to create one or more normalized electronic files from the one or more parsed electronic files.

17 Claims, 8 Drawing Sheets

(56) References Cited

OTHER PUBLICATIONS

LinuxSelfhelp.com, Evolutionary Computing, retrieved from the internet at http://www.linuxselfhelp.com/HOWTO/Al-Alife-HOWTO-4.html, retrieved from the internet on Sep. 7, 2007.

Sushil J. Louis, "Journal Publications", retrieved from the internet at http://www.cse.unr.edu/~sushil/pubs/journal.html, retrieved from the internet on Sep. 7, 2007.

Orestes Chouchoulas, "Shape Evolution: An Algorithmic Method for Conceptual Architectural Design Combining Shape Grammars and Genetic Algorithms", University of Bath, United Kingdom.

IEEE Xplore, Palaniappan, R.; Raveendran, P.; Omatu, S, "VEP optimal channel selection using genetic algorithm for neuralnetwork classification of alcoholics",Neural Networks, IEEE Transactions on Neural Networks, vol. 13, Issue 2, Mar. 2002, p. 486-491, retrieved from the internet at http://ieeexplore.ieee.org/Xplore/login.jsp?url=/iel5/72/21380/00991435.pdf?arnumber=991435, retrieved from the internet on Sep. 7, 2007.

Linux Al & Alife HOWTO: Evoluntary Computing, retrieved from the internet at http://gluv.univalle.edu.co/HOWTO/Al-Alife-HOWTO-4.html,retrieved from the internet on Sep. 7, 2007.

John Eikenberry, "Linux and Artificial Intelligence", retrieved from the internet at http://linuxgazette.net/issue19/ai.html, retrieved from the internet on Sep. 7, 2007.

* cited by examiner

```
/*This is an Apache configuration
File*/
#It describes a web-server property
<server>
hostname 127.0.0.1 localhost
port 8080 8443
protocol https htips
</server>
```

Figure 3a

```
#EMX_COMMENT
/* EMX_COMMENT */
< EMX_SECTION >
EMX_KEY  EMX_VALUE EMX_VALUE
</ EMX_SECTION>
```

Figure 3b

```
CM_B =#, CM_E= NULL
CM_B= /*, CM_E = */
SE_BPR = <, SE_BPO = >, SE_EPR = </,
SE_EPO=>
KV_B=NULL, KV_E=NULL, KV_S= SPACE,
KV_VV_S= SPACE
```

Figure 3c

Glossary:
- CM_B = Comment Begin
- CM_E = Comment End
- SE_BPR = Section Begin Prefix
- SE_BPO = Section Begin Postfix
- SE_EPR = Section End Prefix
- SE_EPO = Section End Postfix
- KV_B = Key-value Begin
- KV_E = Key-value End
- KV_S = Key-value Separator
- KV_VV_S = Value-Value Separator

Figure 3d

EBNF Grammar for CTL:

```
SC  := CM? SE? CM? KV+ CM?
CM  := CM_B 'COMMENT' CM_E?
SE  := SE_BPR? 'SECTION' SE_BPO?
         KV |
         SE_BPR? 'SECTION'
         SE_BPO KV SE_EPR
         ('SECTION' SE_EPO)?
KV  := KVI+
KVI := (KV_B? 'KEY' KV_S? 'VALUE'
         KV_E? ) |
         (KV_B? 'KEY' KV_S? 'VALUE'
         KV_VVS? 'VALUE' KV_E? )
```

Figure 3e

```
P(0) = #  NULL
P(1) = /* */
P(2) = < >  </ >
P(3) = NULL NULL SPACE SPACE
```

Figure 3f a. Section chromosome with all NULL
b. Key-value chromosome with all NULL
c. Disambiguation failures for Comment or Section or Key-value chromosomes
d. Self-consistency failures for Comment or Section or Key-value chromosomes

Figure 5a

TECHNIQUES FOR PARSING ELECTRONIC FILES

FIELD OF THE DISCLOSURE

The present disclosure relates generally to a system and method for adaptive electronic file parsing and, more particularly, to techniques for parsing electronic files.

BACKGROUND OF THE DISCLOSURE

Many software programs are, at some level, customizable. In order to easily customize software, without the need to compile and recompile it into an executable file every time a customization is changed, many software programs utilize one or more electronic configuration files. The configuration files may be in a format known to the particular software program. For example, each line of a configuration file may include a key name and a key value. The configuration file may be read by the software program. The program may look for a specific format when it reads and parses the configuration file. For example, the software program may presuppose that a key name will precede a key value on every line of the configuration file. If a configuration file does not match the format that a software program is able to read, the software program may not read the configuration file, and the software program may not execute, or the software program may use default configuration parameters. In either instance, the usefulness of a configuration file may be reduced or eliminated.

Unfortunately, the format for electronic configuration files may be different for each software program. In an extreme example, each software program may require a different configuration file format. These differences may be insignificant, or the differences may be drastic.

The problems with the state of the art are that the electronic configuration files may need to be in a very specific format. If they deviate from the format, one or more of the values in the configuration file, or perhaps the entire configuration file, may not be able to be read by the software program. This reduces or eliminates the effectiveness of the configuration file.

A configuration management system may be operable to read one or more electronic configuration files across one or more servers. The configuration management system may also be operable to identify configuration files and perform operations on the configuration files. For example, the configuration management system may be operable to identify differences between different configuration files, or may be operable to make changes to one or more configuration files. While many standardized configuration file formats may be available, there is no requirement in the software industry for configuration file standardization. As a result, when a software program is added to a configuration management system, the user must verify that the configuration file for the software program is compatible with the configuration management system. This may result in burdensome user interaction with and required knowledge of one or more configuration file formats.

In view of the foregoing, it may be understood that there are significant problems and shortcomings associated with current electronic file parsing technologies.

SUMMARY OF THE DISCLOSURE

Techniques for parsing electronic files are disclosed. In one particular exemplary embodiment, the techniques may be realized as an apparatus for parsing electronic files comprising an input module operable to read one or more electronic files, a syntax element store, associated with one or more syntax elements, a mutation module operable to mutate one or more of the one or more syntax elements and parse the one or more electronic files read from the input module, and an output module operable to create one or more normalized electronic files from the one or more parsed electronic files.

In accordance with other aspects of this particular exemplary embodiment, the input module, syntax element module, mutation module, and output module are in communication with each other.

In accordance with further aspects of this particular exemplary embodiment, the one or more mutated syntax elements used to parse the one or more parsed electronic files may be stored.

In accordance with additional aspects of this particular exemplary embodiment, the syntax elements are mutated into a second one or more mutated syntax elements used to parse the one or more electronic files.

In accordance with additional aspects of this particular exemplary embodiment, the syntax elements are mutated and applied to the electronic file until a normalized file is produced.

In another particular exemplary embodiment, the techniques may be realized as a method for parsing electronic files comprising the steps of providing one or more syntax elements, reading one or more electronic files comprising one or more features, mutating at least one of the one or more syntax elements into one or more mutated syntax elements, the mutated syntax elements incorporating at least one of the one or more features included in the one or more electronic files, and applying one or more of the mutated syntax elements to the one or more electronic files to parse the one or more electronic files.

In accordance with other aspects of this particular exemplary embodiment, one or more normalized electronic files from the one or more parsed electronic files may be produced.

In accordance with further aspects of this particular exemplary embodiment, the one or more mutated syntax elements used to parse the one or more parsed electronic files may be stored.

In accordance with additional aspects of this particular exemplary embodiment, the syntax elements are mutated into a second one or more mutated syntax elements used to parse the one or more electronic files.

In accordance with additional aspects of this particular exemplary embodiment, the syntax elements are mutated and applied to the electronic file until a normalized file is produced.

In accordance with additional aspects of this particular exemplary embodiment, further comprising at least one signal embodied in at least one carrier wave for transmitting a computer program of instructions configured to be readable by at least one processor for instructing the at least one processor to execute a computer process for performing the method as recited.

In accordance with additional aspects of this particular exemplary embodiment, further comprising at least one processor readable carrier for storing a computer program of instructions configured to be readable by at least one processor for instructing the at least one processor to execute a computer process for performing the method as recited.

In another particular exemplary embodiment, the techniques may be realized as a system for parsing electronic files comprising means for providing one or more syntax elements, means for reading one or more electronic files comprising one or more features, means for mutating at least one of the one or more syntax elements into one or more mutated syntax elements, the mutated syntax elements incorporating at least one of the one or more features included in the one or more electronic files, and means for applying one or more of the mutated syntax elements to the one or more electronic files to parse the one or more electronic files.

In accordance with other aspects of this particular exemplary embodiment, the system may further comprise producing one or more normalized electronic files from the one or more parsed electronic files.

In accordance with further aspects of this particular exemplary embodiment, the system may further comprise storing the one or more mutated syntax elements used to parse the one or more parsed electronic files.

In accordance with additional aspects of this particular exemplary embodiment, the syntax elements are mutated into a second one or more mutated syntax elements used to parse the one or more electronic files.

In accordance with additional aspects of this particular exemplary embodiment, the syntax elements are mutated and applied to the electronic file until a normalized file is produced.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 3a shows an exemplary electronic configuration file, in accordance with an embodiment of the present disclosure;

FIG. 3b shows an exemplary configuration template language script, in accordance with an embodiment of the present disclosure;

FIG. 3c shows exemplary tokens, in accordance with an embodiment of the present disclosure;

FIG. 3d shows an exemplary glossary of token definitions, in accordance with an embodiment of the present disclosure;

FIG. 3e shows one potential grammar list for the configuration template language script, in accordance with an embodiment of the present disclosure;

FIG. 3f shows an exemplary list of potential syntax elements or syntax chromosomes, in accordance with an embodiment of the present disclosure;

FIG. 5a shows an exemplary list of mutation rules in accordance with an embodiment of the present disclosure.

DETAILED DESCRIPTION OF EXEMPLARY EMBODIMENTS

Figure 1:
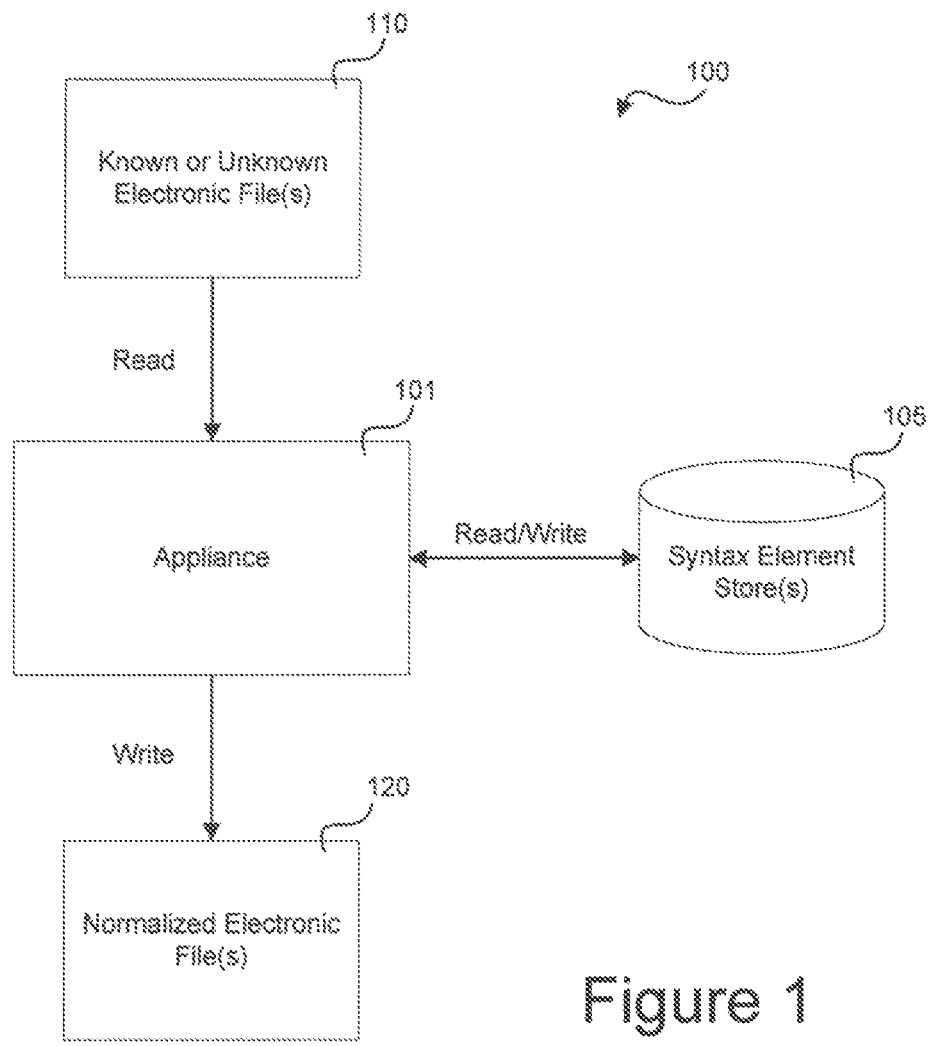
FIG. 1 shows a system level diagram, including input electronic file and output electronic file, in accordance with an embodiment of the present disclosure.

Referring to FIG. 1, a diagram level overview of the general flow of information to and from an appliance 101 in accordance with an embodiment of the present disclosure is shown. The appliance 101, explained in greater detail in the following figures, may be operable to read one or more electronic files 110 of known or unknown type, and may produce one or more normalized electronic files 120. The normalized electronic files 120 may be in a consistent format that may readable by other programs or processes. For example, the normalized electronic files 120 may be in the form of an extensible markup language ("XML") document with a predefined document type definition. The appliance 101 may be in communication with one or more syntax element stores 105. An electronic file 110 of unknown format may not necessarily be in a format which is not known at all to other elements in a system 100 encompassing the appliance 101 and the syntax element store 105. Rather, an electronic file 110 may be in an unknown format if the format is not clear. For example, an electronic file 110 may be read by the appliance 101, but at the time of reading the electronic file 110, the format may not be explicitly known by the appliance 101. Thus, even if the format is ultimately known or discerned by the appliance 101, the electronic file 110 format may be unknown at the time of input.

Figure 2:
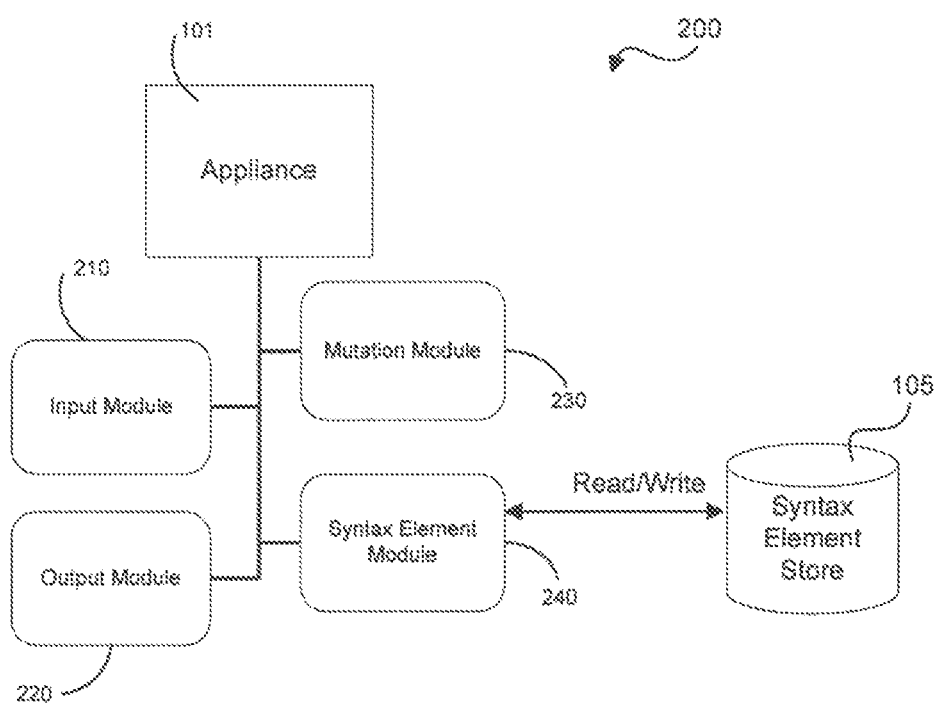
FIG. 2 shows a system level diagram, indicating modules which may be present, in accordance with an embodiment of the present disclosure.

Referring now to FIG. 2, a diagram level overview of a file parsing system 200 in accordance with an embodiment of the present disclosure is shown. The file parsing system 200 may comprise an input module 210, an output module 220, a mutation module 230, and a syntax element module 240. Each module may interact with each other module. In one embodiment, the modules may be contained within one physical system, but this is not necessary. In another embodiment, one or more modules may be placed on one or more physical systems, for example on one or more computers. The one or more computers, and the one or more modules which may reside on the one or more computers, may be in communication via a network. The appliance 101 may contain one or more modules, such as the input module 210, the output module 220, the mutation module 230, and the syntax element module 240. Each module will be explained in more detail below.

The input module 210 may be operable to read one or more electronic files. The electronic files may be located on the same system as the input module 210, or may be located on another system in communication with the input module 210. For example, the input module 210 may create or move one or more electronic files to a storage area network, or another networked file system, or may utilize one or more networks, including without limitation the internet, to read one or more electronic files from a remote system.

The syntax element module 240 may be in communication with the syntax element store 105. The syntax element module 240 may send or receive one or more syntax elements to or from the syntax element store 105. The syntax element store 105 may contain one or more syntax elements. The syntax element store 105 may be contained within one or more electronic files, or may be contained within one or more databases. The syntax element module 240 and the syntax element store 105 may operate on the same system, or may be separated on two or more systems, and may be in communication with each other across one or more networks or other communication apparatus.

The mutation module 230 may be operable to read one or more of the syntax elements, and may be operable to mutate one or more of the one or more syntax elements. The mutations performed on the one or more syntax elements according to one embodiment of the present disclosure are described in more detail below.

The output module 220 may be operable to produce one or more electronic files. The output module 220 may be located on the same system as the input module 210, or may be located on another system in communication with the input module 210. For example, the output module 220 may create or move one or more electronic files to a storage area network, or another networked file system, or may utilize one or more networks, including without limitation the internet, to create or move one or more electronic files on a remote system.

Figure 3:
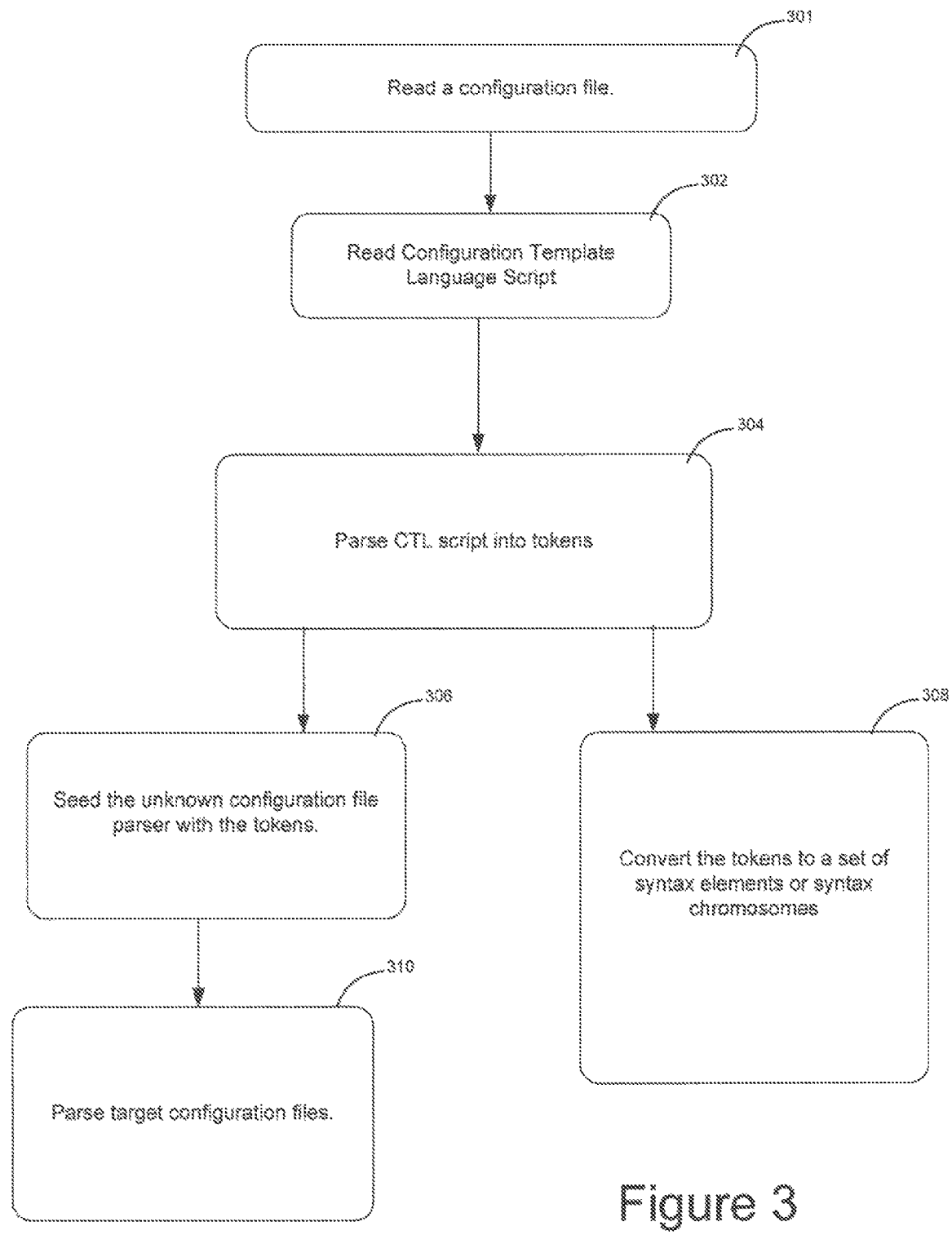
FIG. 3 shows a flow chart for parsing an electronic file of a known format in accordance with an embodiment of the present disclosure.

Referring now to FIG. 3, a flow chart for parsing an electronic file of a potentially known format in accordance with an embodiment of the present disclosure is shown. An embodiment of the present disclosure may be described using an electronic configuration file. While the present disclosure may be operable to read and parse one or more electronic configuration files, it is not a requirement that an electronic file be a configuration file. The configuration file example used is not limiting on the present disclosure.

In this embodiment of the present disclosure, one or more Configuration Template Language ("CTL") scripts may be available. A CTL script may correspond to a configuration file type. In an alternate embodiment, the one or more CTL scripts may correspond to one or more configuration file types. For example, one CTL script may be associated with a standard Windows INI configuration file, and another may be associated with a standard Apache configuration file. An exemplary configuration file is shown in FIG. 3a. The exemplary configuration file shown in FIG. 3a may contain comment types, key types, and key value types.

As shown in step 301, one or more electronic configuration files may be read. As shown in step 302, a CTL script, which may be associated with the electronic configuration file from step 301, may be read. An exemplary CTL script is shown in FIG. 3b. The CTL script shown in FIG. 3b may be associated with the exemplary configuration file found in FIG. 3a. The CTL script may use standard notations within the associated configuration file. For example, and with reference to the exemplary configuration file and CTL script in FIGS. 3a and 3b. The "/*EMX_COMMENT*/" in FIG. 3b may designate that text within the fields "/*" and "*/" be designated as EMX_COMMENT, for purposes of parsing. Further, the "#EMX_COMMENT" line in FIG. 3b may designate that text associated with the "#" sign be designated as EMX_COMMENT.

As shown in step 304, the CTL script associated with the configuration file may be parsed into specific values or "tokens." Exemplary tokens for the exemplary CTL script from FIG. 3b are shown in FIG. 3c. An exemplary glossary of terms associated with the tokens is shown in FIG. 3d. An exemplary "grammar" used to parse the CTL script is shown in FIG. 3e. The grammar may not be applicable to the electronic configuration files themselves, but to the CTL scripts for each electronic configuration file format. In FIG. 3e, for example, the exemplary "grammar" may be an extended Backus-Naur form ("EBNF") metasyntax notation. For example, a comment may begin with a "#" character and may extend for a line. Shown in the exemplary glossary in FIG. 3d, "CM_B" may indicate the beginning of a comment, and "CM_E" may indicate the end of a comment. The "CM_B=#, CM_E=NULL" line shown in FIG. 3c may indicate that a comment begins with a "#" character and ends with a "NULL" character, or a character defined as the end of a line of the configuration file. Similarly, the "CM_B=/*, CM_E=*/" line shown in FIG. 3c may indicate that a comment begins with the "/*" character and ends with the "*/" character. The two tokens may be used to indicate a comment. Similar tokens may be used to, for example, identify sections, keys, and values within a configuration file.

As shown in step 306, the tokens may be stored with the appliance 101, and may therefore be used to parse similar configuration files. In this way, steps 302 and 304 may not be necessary to parse configuration files that have a format where the associated CTL script has already been parsed into tokens. The tokens may also be used in future for an "unknown" configuration file.

As shown in step 308, the tokens may be represented as a set of one or more syntax elements, or syntax chromosomes. Exemplary syntax elements derived from the tokens shown in FIG. 3c are shown in FIG. 3f. For example, one derived syntax element may be "/* */." This may correspond to the "CM_B=/*, CM_E=*/" line as shown in FIG. 3c. The syntax elements may be stored for future use, so that the appliance 101 may attempt to parse unknown configuration files. The syntax elements generated in this way may be formed in sets of elements. For example, one or more syntax elements in a set of syntax elements associated with a given file format may be "section" elements, meant to denote where a section of the configuration file begins or ends. One or more other syntax elements in the same set may be a "comment" element, denoting where a comment begins or ends. The syntax elements or syntax chromosomes may be used to create one or more sets of well-known syntax elements as a beginning point for an adaptable file parser.

As shown in step 310, the tokens created by parsing the CTL script may be used to parse the configuration file. The exemplary tokens generated, shown in FIG. 3c, may be used to parse the configuration file into normalized fields. The normalization may be in the form of an extensible markup language ("XML") document with a pre-defined document type definition. For example, the comment fields shown in the exemplary configuration file shown in FIG. 3a may be expressed in two different ways (e.g., with a "#" character to designate a line of comments or "/*" and "*/" characters to designate the start and end of a comment range). When correctly parsed with the tokens associated with the configuration file, both comment types may be designated as comments. The comments may then be defined in a normalized way. For example, all comments may be normalized to begin with "/*" characters and end with "*/" characters. The method may thus use CTL scripts to read one or more types of configuration files, and may then produce one or more normalized types of configuration files for further use.

The embodiment thus has the ability to represent an configuration file format in a CTL script, which may be created using a consistent and intuitive grammar. The configuration formats may be modeled intuitively using one or more CTL scripts, and the CTL scripts may be used to parse configuration files. In this embodiment, one embodiment of the method of the present disclosure may use a CTL script for each configuration file type. If a CTL script does not describe a particular configuration file, then the configuration file may not be correctly parsed using the CTL script. If a CTL script is not available for a configuration file, the configuration file may still be able to be parsed.

Figure 4:
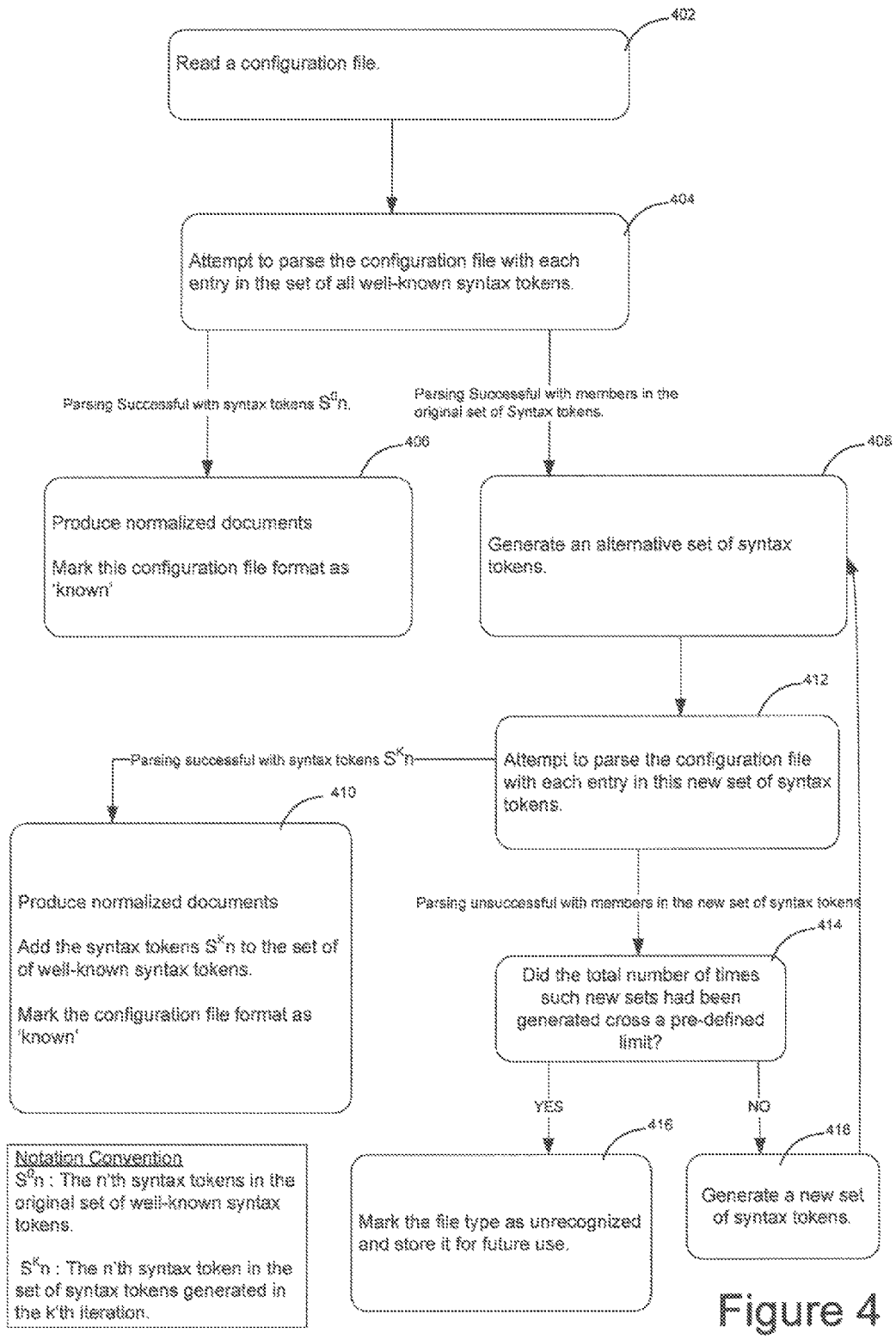
FIG. 4 shows a flow chart for parsing an electronic file of an unknown format in accordance with an embodiment of the present disclosure.

Referring now to FIG. 4, a flow chart for parsing an electronic file of an unknown format in accordance with an embodiment of the present disclosure is shown.

In step 402, an configuration file may be read. In step 404, an attempt is made to parse the configuration file using the syntax elements derived from known files. In an alternate embodiment, the syntax elements may be supplied rather than derived from known CTL scripts associated with known file formats. Each of the available syntax elements may be tried, or a smaller subset of the available syntax elements may be relied upon to attempt to parse the configuration file. If the configuration file is parsed with one or more of the available syntax elements, then the configuration file may be marked as "known," and the configuration file may be parsed using the available syntax elements, to create a normalized configuration file, as shown in step 406. The file format of the configuration file from step 402 may then be associated with the one or more syntax elements used to parse the document, if the file format is not already associated with the one or more syntax elements.

If the application of existing syntax elements is not successful, an alternate set of syntax elements may be generated from the one or more syntax elements used in step 404. The process of generating an alternate set of syntax elements is shown in FIG. 5; steps 408 to 418 are shown below.

Figure 5:
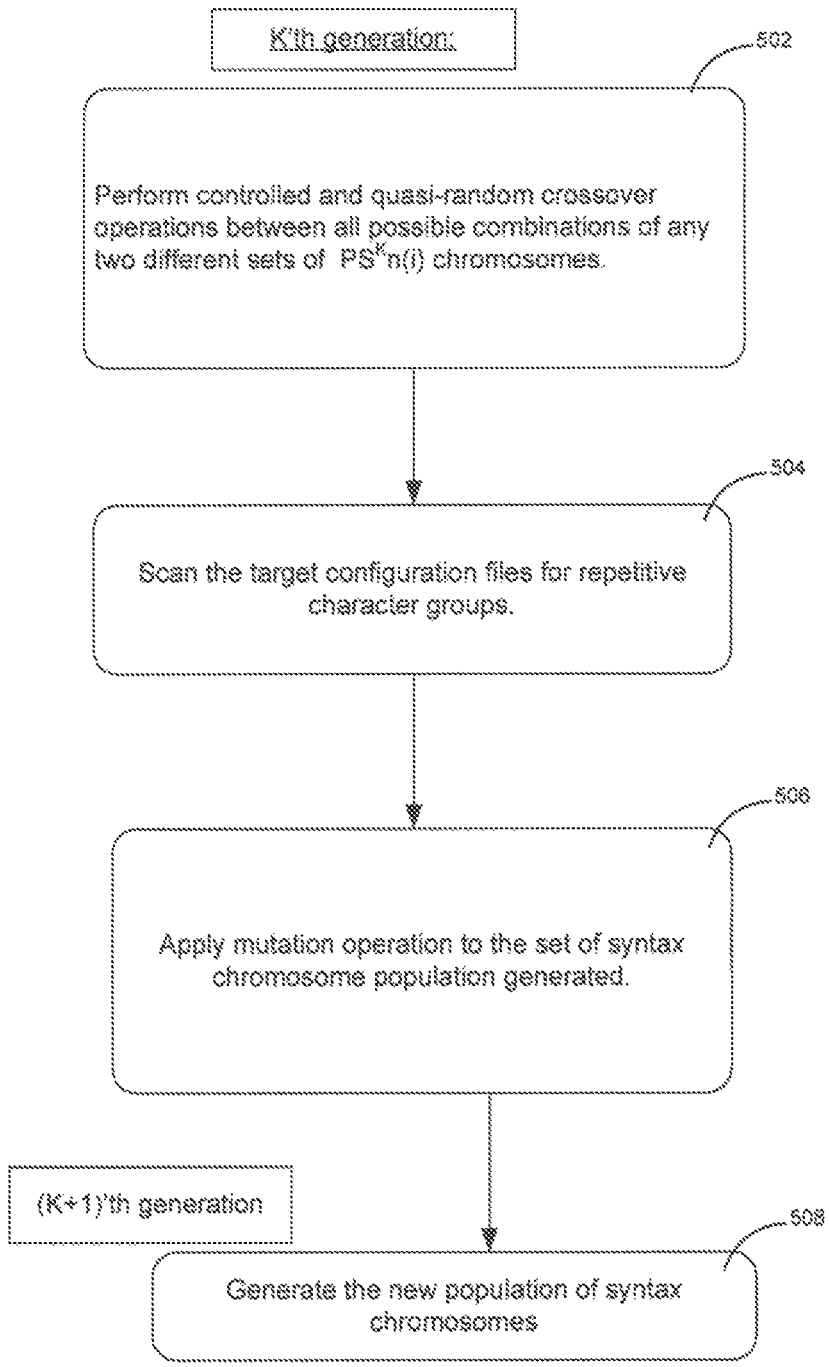
FIG. 5 shows a flow chart for mutating one or more syntax elements according to FIG. 4 in accordance with an embodiment of the present disclosure.

Turning now to FIG. 5, a process for mutating one or more syntax elements in accordance with an embodiment of the present disclosure is shown. In step 502, a controlled and quasi-random crossover operation between combinations of the one or more sets of syntax elements may be performed. A crossover operation, for example, may consist of reducing the one or more syntax elements into smaller pieces, and combining the pieces into a one or more new syntax elements. The set of all possible combinations of original syntax elements may be reduced by removing one or more of the new syntax elements that does not conform to a set of rules. For example, a set of rules is shown in FIG. 5a. Application of the rules may be designed to reduce the number of syntax elements that may be applied to an configuration file.

In step 504, the target configuration file may be utilized, and scanned for repetitive character groups. For example, the target configuration file may have a high occurrence of "/*" character sets. A higher priority may be given to characters and groups of characters that contain non-alphanumeric characters, as these characters may denote that the character or group of characters may be used as a part of the format. A probability distribution may be formed using the repetitive character group scan of the target configuration file.

In step 506, one or more mutation operations may be performed on the new syntax chromosomes. The mutations may take one or more of the one or more characters or groups of characters derived from step 504, and may insert them into one or more of the new syntax elements generated in step 502. The resultant new set of syntax elements may not be created randomly, but may be created using the probability distribution using the repetitive character group scan of the target configuration file.

In step 508, a new set of syntax elements may be generated using the mutated syntax elements created in step 506.

It should be noted that more than one iteration of steps 502 to 508 shown in FIG. 5 may be performed in parallel. For example, one apparatus may perform steps 502 to 508 to create one set of mutated syntax elements, and another apparatus may perform steps 502 to 508 to create a second set of mutated syntax elements. This process may be carried out in parallel by more than one apparatus, or an apparatus may have the capability to generate more than one set of mutated syntax elements in parallel. Each set of the mutated syntax elements may be applied to one or more configuration files in parallel as well. For example, a parallel process to create sets of mutated syntax elements may be applied to a large number of unknown configuration files in a concurrent manner.

Turning back to FIG. 4, and shown in step 412, an attempt may be made to parse the configuration file with the new set of mutated syntax elements.

If step 508 is successful, and the configuration file is successfully parsed, then the configuration file may be marked as "known," and the configuration file may be parsed using the available syntax elements, to create a normalized configuration file, as shown in step 410. The file format of the configuration file from step 402 may then be associated with the one or more mutated syntax elements used to parse the document, if the file format is not already associated with the one or more syntax elements. The new set of mutated syntax elements may be stored for use by files which share the same format as that of the now "known" configuration file from step 402.

If the configuration file may not be parsed using the new set of mutated syntax elements generated from step 408, then a counter, which shows a total number of iterations, may be increased, as shown in step 414. If the number of iterations reaches a pre-determined amount, then the file may be marked as "unknown," and the configuration file may be stored for further analysis using new sets of mutated syntax elements, or other new supplied syntax elements, as shown in step 416. Or, in an alternate embodiment, an error message may be generated, or an operator may in some other way be informed that the configuration file may not have been successfully parsed. If the counter has not reached the pre-determined amount, then a new set of mutated syntax elements may be generated, as shown in step 418. A transition from step 418 to step 408 may be performed, to generate one or more new sets of mutated syntax elements. In another embodiment, if unsuccessful parsing the configuration file using a first set of mutated syntax elements is unsuccessful, new sets of mutated syntax elements may be generated until the configuration file may be parsed by a set of mutated syntax elements.

At this point it should be noted that in accordance with the present disclosure as described above typically involves the processing of input data and the generation of output data to some extent. This input data processing and output data generation may be implemented in hardware or software. For example, specific electronic components may be employed in a computer or similar or related circuitry for implementing the functions associated with parsing configuration files in accordance with the present disclosure as described above. Alternatively, one or more processors operating in accordance with stored instructions may implement the functions associated with parsing configuration files in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for parsing electronic files comprising:
at least one processor configured to:
read an electronic file comprising one or more features;
parse the read electronic file using a first set of syntax elements;
perform a crossover operation between combinations of syntax elements from at least the first set of syntax elements to generate new syntax elements in the event that parsing the read electronic file using the first set of syntax elements is not successful;
scan the read electronic file for repetitive character groups;
form a probability distribution based on the repetitive character groups;
mutate the new syntax elements using the repetitive character groups to generate a second set of syntax elements based on the probability distribution;
parse the electronic file using syntax elements in the second set of syntax elements; and
create a normalized electronic file from the electronic file parsed using the syntax elements in the second set of syntax elements; and
at least one memory, coupled to the at least one processor, configured to provide the at least one processor with instructions.

2. The system according to claim 1, wherein the at least one processor and the at least one memory are in communication with each other.

3. The system according to claim 1, wherein the at least one processor is further configured such that the syntax elements in the second set of syntax elements are stored.

4. The system according to claim 1, wherein the new syntax elements are repeatedly mutated until parsing the electronic file using the syntax elements in the second set of syntax elements results in one or more normalized electronic files.

5. A method for parsing electronic files comprising the steps of:
reading an electronic file comprising one or more features;
parsing the read electronic file using a first set of syntax elements;
performing a crossover operation between combinations of syntax elements from at least the first set of syntax elements to generate new syntax elements in the event that parsing the read electronic file using the first set of syntax elements is not successful;
scanning the read electronic file for repetitive character groups;
forming a probability distribution based on the repetitive character groups;
mutating the new syntax elements using the repetitive character groups to generate a second set of syntax elements based on the probability distribution;
parsing the electronic file using syntax elements in the second set of syntax elements; and
create a normalized electronic file from the electronic file parsed using the syntax elements in the second set of syntax elements.

6. The method according to claim 5, further comprising storing such that the syntax elements in the second set of syntax elements are stored.

7. The method according to claim 5, where the new syntax elements are repeatedly mutated until parsing the electronic file using the syntax elements in the second set of syntax elements results in one or more normalized electronic files.

8. At least one non-transitory processor readable storage medium storing a computer program of instructions configured to be readable by at least one processor for instructing the at least one processor to execute a computer process for performing the method as recited in claim 5.

9. A system for parsing electronic files comprising:
means for reading an electronic file comprising one or more features;
means for parsing the read electronic file using a first set of syntax elements;
means for performing a crossover operation between combinations of syntax elements from at least the first set of syntax elements to generate new syntax elements in the event that parsing the read electronic file using the first set of syntax elements is not successful;
means for scanning the read electronic file for repetitive character groups;
means for forming a probability distribution based on the repetitive character groups;
means for mutating the new syntax elements using the repetitive character groups to generate a second set of syntax elements based on the probability distribution;
means for parsing the electronic file using syntax elements in the second set of syntax elements; and
means for creating a normalized electronic file from the electronic file parsed using the syntax elements in the second set of syntax elements.

10. The system according to claim 9, further comprising means for storing such that the syntax elements in the second set of syntax elements are stored.

11. The system according to claim 9, where the new syntax elements are repeatedly mutated until parsing the electronic file using the syntax elements in the second set of syntax elements results in one or more normalized electronic files.

12. The system according to claim 1, wherein the at least one processor is further configured to:
scan the electronic file for one or more characters or groups of characters; and
insert one or more of the one or more characters or groups of characters into one or more of the new syntax elements.

13. The method according to claim 5, further comprising:
scanning the electronic file for one or more characters or groups of characters; and
inserting one or more of the one or more characters or groups of characters into one or more of the new syntax elements.

14. The system according to claim 9, further comprising:
means for scanning the electronic file for one or more characters or groups of characters; and
means for inserting one or more of the one or more characters or groups of characters into one or more of the new syntax elements.

15. The system according to claim 1, wherein the electronic file is an electronic configuration file to be utilized by a software program.

16. The method according to claim 5, wherein the electronic file is an electronic configuration file to be utilized by a software program.

17. The system according to claim 9, wherein the electronic file is an electronic configuration file to be utilized by a software program.

* * * * *